Dec. 22, 1936.  G. EATON  2,065,434

ELECTRIC TOASTER

Filed March 10, 1930   2 Sheets-Sheet 1

INVENTOR
GEORGE EATON
BY
Milburn and Milburn
ATTORNEYS

Dec. 22, 1936.   G. EATON   2,065,434
ELECTRIC TOASTER
Filed March 10, 1930   2 Sheets-Sheet 2
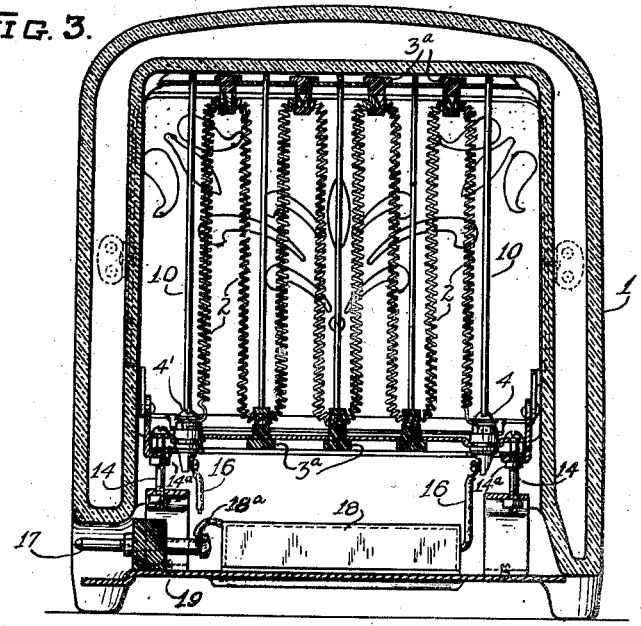
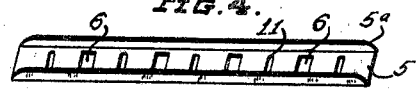
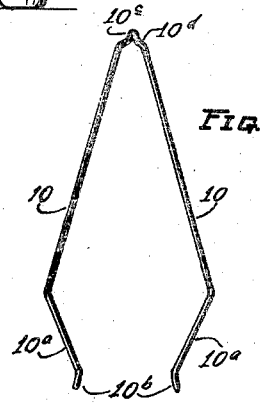
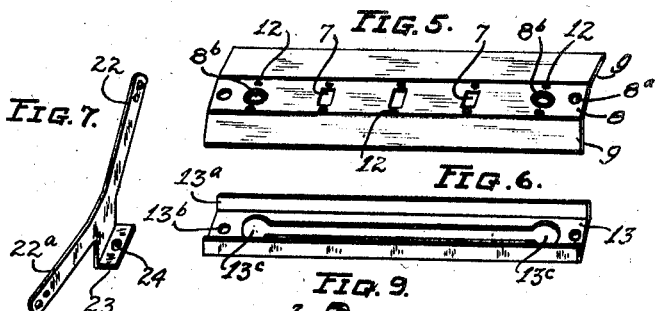
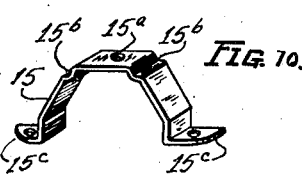
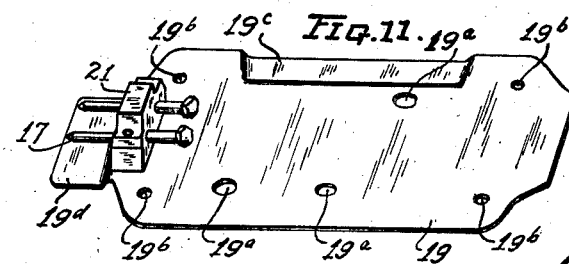
INVENTOR
GEORGE EATON
ATTORNEYS Patented Dec. 22, 1936

2,065,434

UNITED STATES PATENT OFFICE 2,065,434

ELECTRIC TOASTER

George Eaton, Cleveland, Ohio

Application March 10, 1930, Serial No. 434,784

14 Claims. (Cl. 219—19)

This invention relates to the art of electric toasters, and is a continuation in part of my pending application, Serial No. 203,771, filed July 6, 1927, which became Patent No. 1,753,601.

The object of the present invention is to devise an electric toaster in which the main body or frame thereof consists of a one-piece casting of porcelain or like material, and upon which there is mounted doors for opening and closing for the insertion and removal of the bread.

A further object is to devise a toaster of the form just referred to in which there are mounted upon the opposite sides of the frame, doors for supporting the bread and which, upon opening and closing, will cause the bread to be reversed so as to toast the same upon both sides thereof.

A further object is to devise an efficient and simple manner of constructing and attaching the several elements of the toaster, including the electric resistance element, the grid bars, and the doors.

Another object consists in providing means in connection with such a toaster construction for the assembly of a timing and switch mechanism whereby the toasting operation may automatically be terminated at a predetermined period, all of which structure is embodied in a compact and efficient assembly.

Other objects will appear from the following description and claims when considered together with the accompanying drawings.

Figure 1:
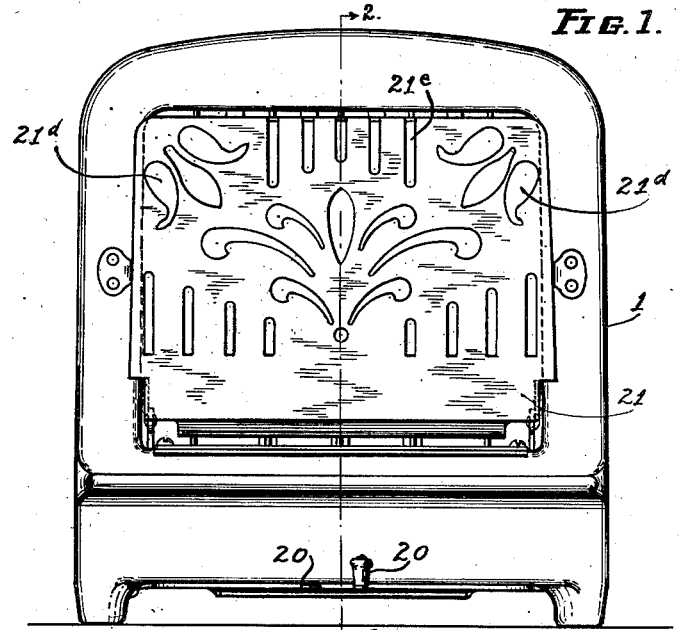
Figure 2:
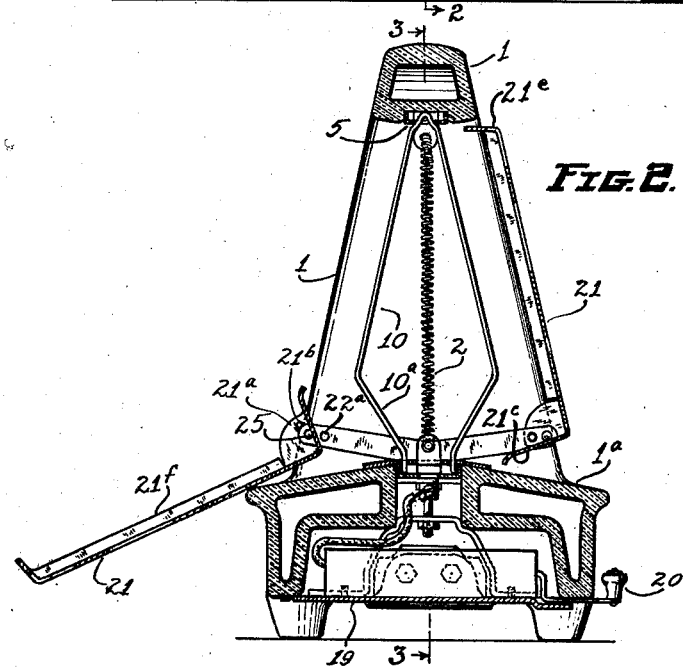

Fig. 1 is an elevation of my improved toaster; Fig. 2 is a sectional view taken on line 2—2 of Fig. 1; Fig. 3 is a sectional view taken on line 3—3 of Fig. 2; Fig. 4 is a perspective view of the plate arranged at the top of the frame for supporting the resistance element and the grid bars; Figs. 5 and 6 are perspective views of the plates arranged at the bottom of the frame for supporting the resistance element and the grid bars; Fig. 7 is a perspective view of one of the transversely extending bars upon which the doors are mounted; Fig. 8 is a view of one of the resilient grid bars; Fig. 9 is a perspective view of one of the buttons through which the resistance coil is extended; Fig. 10 is a perspective view of one of the brackets which is arranged on the under side of the frame and to which the plates 5 and 6 are attached; and Fig. 11 is the bottom closure plate upon which the timing mechanism is mounted.

The main frame 1 consists entirely of porcelain or like material and is cast as an integral, one-piece unit throughout, including the top, bottom, and end portions, as well as the legs upon which it is supported. This frame is of a substantially rectangular form which is open through the middle thereof and within which space the electric resistance element and the grid bars are adapted to be assembled. The ends of the frame are inclined downwardly and outwardly and the upper surface of the bottom is inclined slightly downwardly and outwardly, this bottom part being larger than the top part, as indicated in the drawings. The frame 1 has a slot 1ª through its bottom, for a purpose to be explained. It is to be understood, however, that the present disclosure is merely for purposes of illustration and that there may be adopted other modified forms of construction without departing from the spirit of the invention as herein set forth.

The resistance coil 2 is extended through the buttons 3 of electric insulation which are arranged at the top and bottom of the frame, the one end of the coil being attached to the terminal 4, while the other end is attached to the terminal 4'. The buttons 3 are mounted at the top of the frame by means of the metal plate 5 provided with the flanges 5ª and positioned within a suitably formed groove in the under side of the top of the porcelain frame, as clearly indicated in Fig. 2. The plate 5 is provided with the openings 6 through which the buttons 3 extend, these buttons being provided with the flanges 3ª by which they are supported in depending position by the plate 5. The coil 2 is extended at the lower part of the frame through another series of buttons corresponding to those just now disclosed but arranged in a staggered manner with respect to the upper ones, as clearly indicated in Fig. 3. The lower buttons, which are duplicates of the upper buttons, are extended upwardly through the openings 7 in the middle portion 8 of the plate which extends across the lower part of the frame. This same plate is provided with the side portions 9 extending slightly downwardly from the middle part 8 and resting upon the corresponding portions of the upper surface of the lower part of the frame 1 which are inclined outwardly and downwardly from the middle thereof, as above explained.

The grid bars 10 are formed of spring wire and each one comprises within itself oppositely disposed portions which serve for both sides of the toaster. The opposite parts of the grid bars 10 extend downwardly and outwardly in accordance with the general shape of the toaster frame, as clearly indicated in Fig. 2. The lower portions 10ª of the grid bars extend inwardly so as to form a substantial bow and the extreme lower ends of the opposite sides of the grid bars extend vertically, as indicated at 10b. The extremely upper end portion of each grid bar is pinched together, as indicated at 10c, and is adapted to be inserted in the slots 11 provided in the upper plate 5. The shoulders 10d of the grid bars engage against the under side of the plate 5, and upon spreading the side parts of the grid bars, the lower ends thereof may be raised sufficiently for insertion through the openings 12 which are arranged in two series along the opposite side portions of the middle part 8 of the lower plate. The lower ends of the portions 10b are adapted to rest upon the auxiliary plate 13 which is provided with the upwardly extending flanges 13a and which is adapted to be positioned within the slot 1a through the bottom of the frame. The upper edges of the flanges 13a engage the angles between the portions 8 and 9 of the companion plate. Extending through the registering apertures 8a and 13b in these two plates are the bolts 14, the lower ends of which are secured to the upper middle portions of the brackets 15 through the apertures 15a. These brackets are provided with the shoulder portions 15b which engage the corners of the porcelain frame at the lower end of the slot 1a. The bolts 14 are also provided with the nuts 14a to maintain the two plates 8 and 13 together. Thus, with the arrangement just described, the plate 8 with its flanges 9 extends across the slot 1a and engages the upper surface of the lower part of the frame and will be held in such position by virtue of the engagement of the bracket 15 with the under side thereof. The terminals 4 are seated in the counter-sunk apertures 8b in the plate 8 while the lower ends of these terminals extend through the substantially circular openings 13c provided in the end portions of the plate 13. The plate 13 is slotted throughout the main extent thereof between the openings 13c. The terminals 4 upon the lower ends thereof are provided with means for attaching the electric cables 16, one of which extends directly to one of the binding posts 17, while the other has connection with the automatic, time-controlled switch mechanism 18, which, in turn, has a cable 19 connecting with the other binding post. The binding posts are confined within the limits of the frame so as not to project there-beyond, and suitable space is provided in the casting 1 for the proper projection of the binding posts and the ready attachment of the lead wires. The timing mechanism 18, here indicated only diagrammatically, is attached to the metal plate 19 by means of screws through the openings 19a with proper insulation, and this plate is attached by means of screws through the openings 19b to the apertured laterally extending end portions 15c of the brackets 15. The plate 19 is offset slightly, as indicated at 19c, to permit the extension of the control levers 20 of the timing mechanism out from under the bottom of the frame. There is supported also upon the plate 19 the electric insulating block 21 within which are mounted the binding posts 17, and the plate 19 has an extension 19d arranged under the binding posts for further protection thereof. In the use of this timing mechanism, which is now upon the market, adjustment of one of the levers will set it for a desired length of time, while actuation of the other lever will set this mechanism into operation. Then, upon expiration of the pre-determined period of time, the switch will be automatically opened and the toasting operation discontinued. Then upon reversing the bread, the other side can be toasted for the same length of time by operation of the timing mechanism in the same manner.

The doors 2 which may be formed of a suitable metal are each hingedly mounted at the two lower corners thereof upon the outer ends of the transversely extending metal members 22. These members are arranged within the open part of the frame, one at each end thereof, and are each secured in position by means of an inwardly extending ear 23 provided with an aperture 24 through which extends the bolt 14. The ears 23 engage the under side of the plate 13, and the nuts 14a engage the under side of the ears 23, while the ends of the plate 13 abut against the sides of the members 22. The means for hingedly mounting the doors upon the members 22 may consist of the rivets 25 or any other suitable form of pivotal connection. In the present case, the rivets extend through the ears 21a provided upon the doors. These same ears may be provided with inwardly extending projections formed integrally therewith and indicated at 21b, for snap engagement in the apertures 22a for the purpose of maintaining the doors in closed position. As indicated in the drawings, especially Figs. 2 and 7, the laterally extending arms 22 are inclined slightly upwardly from the middle thereof so that when the doors are in closed position, they will occupy inwardly inclined position and will extend substantially parallel to the main parts of the grid bars 10. Suitable space is allowed between the grid bars and the doors to accommodate the thickness of the bread to be toasted. These doors have provided in their bottom ends the inwardly extending flanges 21c upon which the bread is supported. When the doors are fully opened, they will rest upon the outer edge of the lower part of the frame structure 1, and will be inclined downwardly, as indicated in Fig. 2. A portion of the frame thereby serves as a stop means for limiting the opening of the door, and the parts are so constructed and arranged that upon opening the door, the bread will automatically reverse itself in its position within the door so that upon again closing the door, the other side of the bread may be toasted. To this extent, the door may be considered also as serving the function of an adjustable bread-supporting means.

The main part of the door in each case may be provided with any suitable form of ventilating opening, indicated by the slots 21d. It has been discovered, however, that the best results can be obtained by having the lower part of the door imperforate and providing ventilating means 21e at the upper edge thereof. The openings 21e extend not only through the face of the door but also through a part of the inwardly extending flange at the top edge thereof. With this arrangement, the heat which will rise is permitted to escape at the top of the door to a sufficient extent to prevent burning of the toast at the upper part thereof. In this way, the bread may be toasted uniformly throughout. It is found to be advantageous also to so mount the doors that the inwardly extending vertical flanges 21f will be slightly spaced from the porcelain frame 1 when in closed position for the purpose also of preventing burning of the bread.

In assembling the parts, the buttons 3 are placed in the plate 8, the plates 8 and 13, bars 22 and the doors are then connected together and inserted as a unit in the frame, the bolts 14 anchoring this unit to the brackets 15. The plate 5 is then provided with its buttons 3 and is assembled in position by application of the grid bars 10. As soon as one or two of the bars 10 are in position, the coil 2 can be extended through the buttons 3 and connected to the terminals, whereupon the remaining bars 10 may be placed in position. The cable connections may then be made upon the under side of the frame and the bottom plate with the switch mechanism placed in position.

In the present structure, I have provided not only a one-piece porcelain frame with all its advantages with respect to service and appearance but have also made it possible to employ therewith the hinged doors mounted in such a manner that the bread may be reversed for toasting upon both sides. It is to be understood that the porcelain frame may be given any desired color or pattern and that it may thus be adopted as another piece of a china set. The porcelain has the further advantages that it will not rust or tarnish; it can be easily cleaned; it is perfectly insulated throughout; and it is entirely free of bolts or screws so far as the construction of the frame itself is concerned. At the same time, the present construction has the advantages of the popular type of toaster in which the bread may be reversed by opening and closing the doors. Also, the manner of mounting the resistance coil as well as the grid bars and the doors is of a comparatively simple nature, and the entire assembly is of an extremely compact form. The timing mechanism, which is so located as to be altogether out of view, may be omitted if so desired.

Other advantages will be apparent to those who are skilled in the art to which this invention relates.

What I claim is:

1. An electric toaster comprising a completely formed, one-piece frame of porcelain or the like adapted to toast bread upon opposite sides of the frame, means for attaching an electric resistance element thereto, bread-supporting means mounted upon opposite sides of said frame for adjustment with respect to said resistance element, and a single means attached to said frame for mounting of said bread-supporting means.

2. An electric toaster comprising a completely formed, one-piece frame of porcelain or the like adapted to toast bread upon opposite sides of the frame, an electric resistance in the frame, grid means having removable resilient engagement in said frame, an adjustable door upon each side thereof for cooperation therewith in supporting bread in toasting position, and means mounted in the middle of the frame bottom for supporting said resistance, grid and doors.

3. An electric toaster comprising a frame, an electric resistance element, and a double one-piece grid element having integral resilient portions held in position exclusively by spring action for self-supporting engagement within said frame and for supporting bread upon opposite sides of said resistance element.

4. An electric toaster comprising a frame, an electric resistance element, and a double one-piece resilient grid element sprung into assembly for maintaining said resistance element in position and having integral portions for supporting bread upon opposite sides of said resistance element.

5. An electric toaster comprising a frame having inclined opposite sides for the bread to be toasted, an electric resistance element, means for anchoring said resistance element, and double one-piece resilient grid means for securing said anchoring means sprung into assembly in position in said frame and for supporting bread in toasting position upon opposite sides of said resistance element.

6. An electric toaster comprising a frame, separate oppositely and laterally disposed upper and lower attaching means in said frame, an electric resistance element attached to and extending between said attaching means, means for securing said attaching means in position in said frame, a door, and means for mounting the same upon one of said attaching means.

7. An electric toaster comprising a substantially rectangular, open, one-piece frame of porcelain or the like adapted to support bread upon the opposite sides thereof, the bottom of said frame having a middle opening therethrough, an electric resistance means, grid means and a closure means for said frame, said closure means being upon opposite sides of said frame and means positioned in said opening for supporting all of said means.

8. An electric toaster comprising a substantially rectangular, open, one-piece frame of porcelain or the like having integral top, bottom and ends, the bottom of said frame having an opening therethrough, an electric resistance means, grid means and a closure means for said frame, said closure means being upon the opposite sides of said frame, means extending through said opening for supporting all of said means, and an automatic time switch mechanism arranged beneath said frame and having connection through said opening with said electric resistance means.

9. An electric toaster comprising a frame, an electric resistance element, and a grid for supporting bread upon opposite sides of said resistance element, said grid consisting of a plurality of double one-piece resilient elements each of which is held in position exclusively by spring action and thereby has self-supporting engagement within said frame and is provided with oppositely disposed bread-engaging portions.

10. An electric toaster comprising a frame, an electric resistance element, and a grid for supporting bread upon opposite sides of said resistance element, said grid consisting of a plurality of double one-piece elements each of which has oppositely disposed bread-engaging portions, and having also integral means for supporting engagement with the resistance element at the top and bottom of the frame for maintaining the same in assembly.

11. An electric toaster comprising a substantially rectangular, open, one-piece frame of porcelain or the like, having integral top, bottom and ends, the bottom of said frame having an opening therethrough, an electric resistance means, grid means and a closure means for said frame, said closure means being upon the opposite sides of said frame, and means extending through said opening and clamped upon the upper and lower surfaces of the frame bottom, for supporting all of said means, thereby facilitating attachment of the said means to a frame of porcelain.

12. An electric toaster comprising a completely formed, one-piece frame of porcelain or the like adapted to toast bread upon opposite sides of the frame, means for attaching an electric resistance element thereto, said means including buttons to which the element is attached at top and bottom of the frame, plates for anchoring the buttons, and resilient grid members for holding said plates in position at the top and bottom of the frame, and an adjustable bread-supporting means mounted upon each of the opposite sides of the frame.

13. An electric toaster comprising a completely formed, one-piece frame of porcelain or the like adapted to toast bread upon opposite sides of the frame, means for attaching an electric resistance element thereto, said means including buttons to which the element is attached at top and bottom of the frame, plates for anchoring the buttons, said frame having a groove at the top thereof to receive the upper of said plates, the bottom of said frame having an opening therethrough, means clamped in the said opening for holding the lower plate in position, and a plurality of one-piece bowed, resilient grid members extending between and engaging said upper and lower plates so as to maintain the same in assembly, and an adjustable bread-supporting means mounted upon each of the opposite sides of the frame.

14. An electric toaster comprising a completely formed, one-piece frame of porcelain or the like adapted to toast bread upon opposite sides of the frame, an electric resistance element, grid means upon opposite sides of said resistance element, means at the lower part of said frame for securing said resistance element and grid means in assembly in said frame, and bread-supporting doors hingedly mounted upon opposite sides and at the lower part of said frame, said resistance element, grid means and doors having the same means for supporting the same at the lower part of said frame.

GEORGE EATON.